United States Patent
Cornaby et al.

(10) Patent No.: US 6,934,802 B2
(45) Date of Patent: Aug. 23, 2005

(54) BAND DETECTION AND PERFORMANCE OPTIMIZATION FOR A DATA STORAGE DEVICE

(75) Inventors: Stephen R. Cornaby, Yukon, OK (US); Travis D. Fox, Edmond, OK (US); Edwin S. Olds, Edmond, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 324 days.

(21) Appl. No.: 10/345,476

(22) Filed: Jan. 15, 2003

(65) Prior Publication Data

US 2003/0200393 A1 Oct. 23, 2003

Related U.S. Application Data

(60) Provisional application No. 60/373,892, filed on Apr. 19, 2002.

(51) Int. Cl.[7] .............................................. G06F 12/08
(52) U.S. Cl. ...................................... 711/113; 711/137
(58) Field of Search ................................ 711/113, 118, 711/137

(56) References Cited

U.S. PATENT DOCUMENTS

| | | |
|---|---|---|
| 5,313,626 A | 5/1994 | Jones et al. |
| 5,530,829 A | 6/1996 | Beardsley et al. |
| 5,570,332 A | 10/1996 | Heath et al. |
| 5,584,007 A | 12/1996 | Ballard |
| 5,636,355 A | 6/1997 | Ramakrishnan et al. |
| 5,664,145 A | 9/1997 | Apperley et al. |
| 5,727,183 A | 3/1998 | Takahashi |
| 5,829,018 A | 10/1998 | Moertl et al. |
| 5,875,455 A | 2/1999 | Ito |
| 5,983,319 A | 11/1999 | Ito |
| 6,164,840 A | 12/2000 | Lynch |
| 6,189,080 B1 | 2/2001 | Ofer |
| 6,263,408 B1 | 7/2001 | Anderson et al. |

Primary Examiner—Hiep T. Nguyen
(74) Attorney, Agent, or Firm—Fellers, Snider, et al.

(57) ABSTRACT

A data storage device with a cache memory in communication with a control processor programmed with a routine to effect data throughput with a host device. The data storage device includes a head-disc assembly responsive to the control processor retrieving a host data along with a speculative data in a form of a read data. The control processor adjusting a range for acquisition of the speculative data based on data stored in cache memory fragments of the cache memory. The cache memory storing the read data in an unused cache memory fragment, while the control processor updates a history queue and a band count table based on the acquired read data and releases an oldest cache memory fragment with a lowest count value in the band count table from the cache memory in response to a need for cache memory space.

20 Claims, 5 Drawing Sheets

0 GB (Inner Zone)
LBA = 0

36.0 GB (Outer Zone)
LBA = 75,497,472

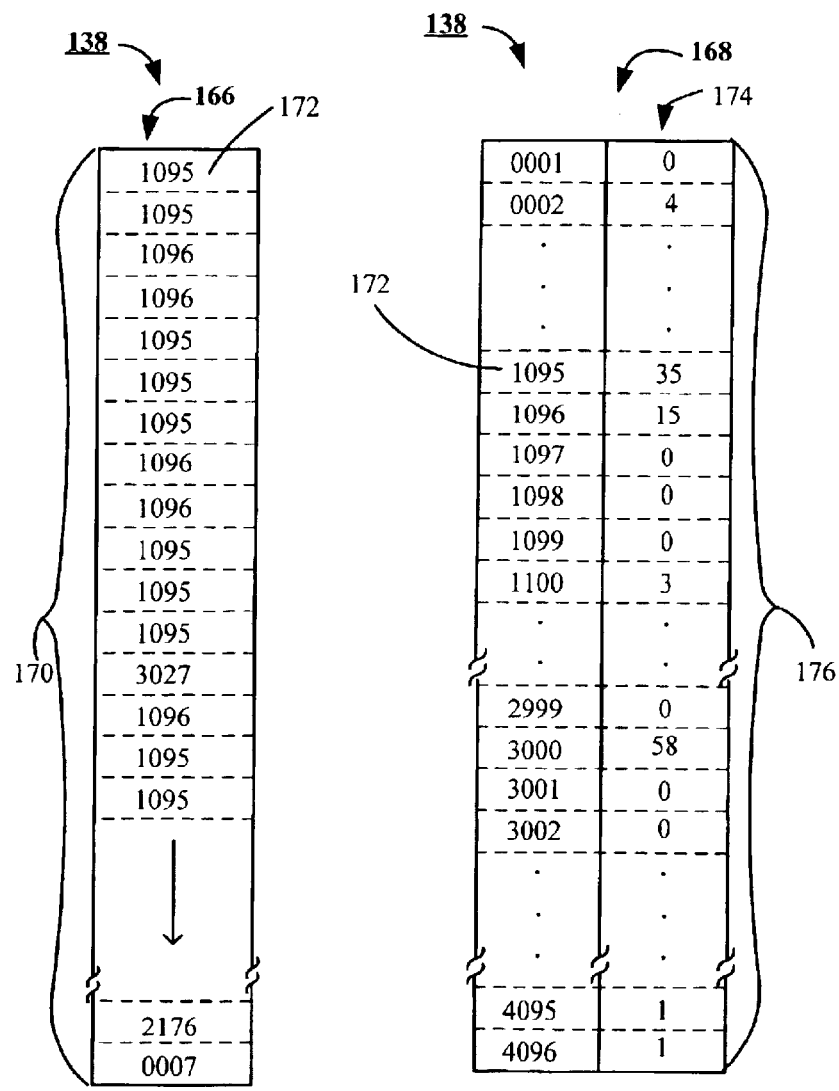
FIG. 5  FIG. 6
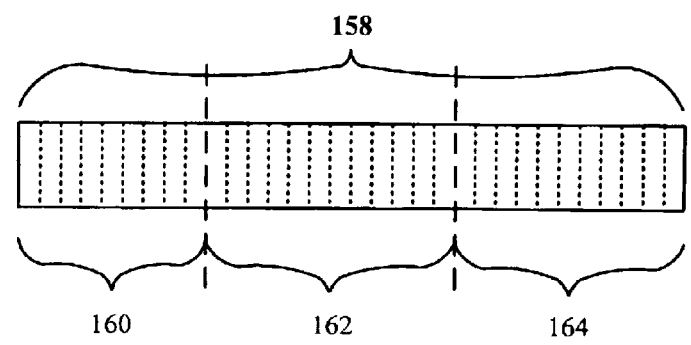
FIG. 4

| 244 |
|---|
| 44096 |
| 10002 |
| 20001 |
| 20001 |
| 14096 |
| 14096 |
| 20001 |
| 60001 |
| 60001 |
| 60001 |
| 20001 |
| 20001 |
| 20001 |
| 14096 |
| 14096 |
| 20001 |
| ↓ |
| 14096 |
| 20001 |

| | 250 |
|---|---|
| 10001 | 0 |
| 10002 | 4 |
| . | . |
| . | . |
| . | . |
| 14095 | 0 |
| 14096 | 15 |
| 20001 | 35 |
| 20002 | 0 |
| 20003 | 0 |
| . | . |
| . | . |
| . | . |
| 44095 | 0 |
| 44096 | 1 |
| 50001 | 1 |
| 50002 | 0 |
| . | . |
| . | . |
| . | . |
| 94095 | 12 |
| 94096 | 0 |

BAND DETECTION AND PERFORMANCE OPTIMIZATION FOR A DATA STORAGE DEVICE

RELATED APPLICATIONS

This application claims priority to U.S. Provisional Application No. 60/373,892 filed Apr. 19, 2002, entitled Method and Algorithm for LBA Band Detection and Performance Optimization.

FIELD OF THE INVENTION

This invention relates generally to the field of magnetic data storage devices, and more particularly, but not by way of limitation, to logical block address band detection and performance optimization for a data storage device.

BACKGROUND

Data storage devices are used for data storage in modern electronic products ranging from digital cameras to computers and network systems. Ordinarily, a data storage device includes a mechanical portion, or head-disc assembly, and electronics in the form of a printed circuit board assembly mounted to an outer surface of the head-disc assembly. The printed circuit board assembly controls functions of the head-disc assembly and provides a communication interface between the data storage device and a host being serviced by the data storage device.

Typically, the head-disc assembly has a disc with a recording surface rotated at a constant speed by a spindle motor assembly and an actuator assembly positionably controlled by a closed loop servo system. The actuator assembly supports a read/write head that writes data to and reads data from the recording surface. Data storage devices using magnetoresistive read/write heads typically use an inductive element, or writer, to write data to information tracks of the recording surface and a magnetoresistive element, or reader, to read data from the information tracks during drive operations.

The data storage device market continues to place pressure on the industry for data storage devices with increased capacity at a lower cost per megabyte and higher rates of data throughput between the data storage device and the host.

Regarding data throughput, there is a continuing need to improve throughput performance for data storage devices (by class), particularly on industry standard metrics such as "WinBench Business" and "WinBench High-End" benchmarks.

As read commands are executed by the data storage device, additional non-requested read data spatially adjacent to the host-requested read data are often read and stored with the hope of satisfying future host read data requests from this data, thereby eliminating the need for mechanical access. This process of reading and storing additional information is known as speculative reading, and the associated data is speculative read data.

Essentially, there are two types of speculative read data; read on arrival (ROA) data and read look ahead (RLA) data. In executing a host read data request command, a target track that contains the request host read data is accessed. Upon arrival at the target track, a predetermined number of data blocks preceding the data blocks containing the host read data (i.e., ROA data) are read, the host read data are then read followed by a reading of a predetermined number of data blocks subsequent to the host read data (i.e., RLA data).

To improve throughput performance, improved techniques for speculative data acquisition and cache memory management are needed. Therefore, it would be advantageous to more accurately predict future data requests based on historical requests for data.

As such, challenges remain and a need persists for improvements in data throughput between the data storage device and the host by monitoring historical requests for data for use in improved speculative data acquisitions methods and improved cache memory data retention efficiencies.

SUMMARY OF THE INVENTION

In accordance with preferred embodiments, a method for adjusting a range for acquisition of a speculative associated with a first logical block address of a host data request command based on a second logical block residing in a cache memory that has an address closest to the first logical block address.

The data storage device includes: a cache memory in communication with a control processor programmed with a routine to effect data throughput with a host device; a head-disc assembly responsive to the control processor retrieving a host data along with a speculative data in a form of a read data. The control processor is programmed with a variable data retrieval and retention prioritization routine for adjusting a range for acquisition of the speculative data based on data stored in cache memory segments of the cache memory.

The cache memory stores the acquired read data in an unused cache memory segment, while the control processor updates both a history queue and a band count table based on the acquired read data, and releases an oldest data having a cache memory segment with a lowest count value in the band count table from the cache memory in response to a need for cache memory space to accommodate retention prioritization of read data in the cache memory.

These and various other features and advantages that characterize the claimed invention will be apparent upon reading the following detailed description and upon review of the associated drawings.

BRIEF DESCRIPTION OF THE DRAWINGS

FIG. 4 is a graphical representation of a logical block address of a host data portion of the read data of the data storage device of FIG. 1.

FIG. 5 is a graphical representation of a history queue of the cache memory of the data storage device of FIG. 1.

FIG. 6 is a graphical representation of a band index table of the cache memory of the data storage device of FIG. 1.

FIG. 8 is a graphical representation of a history queue of the cache memory of the data storage device of FIG. 1, sized to accommodate a predetermined number of occurrences of the band index together and its associated high order band index.

FIG. 9 is a graphical representation of a band index table of the cache memory of the data storage device of FIG. 1, sized to accommodate a high order band index together with an associated band index.

DETAILED DESCRIPTION

Figure 1:
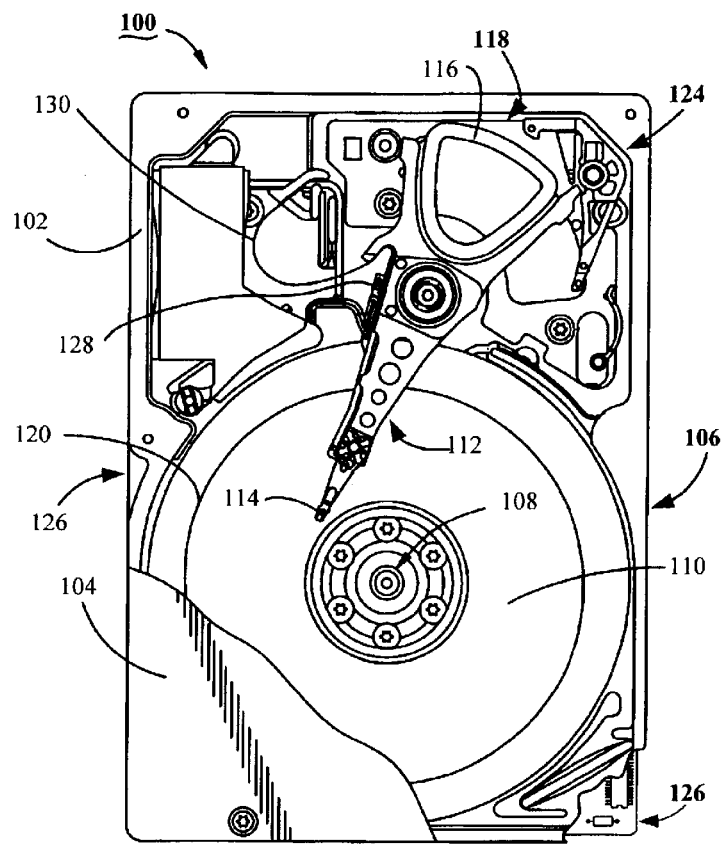
FIG. 1 is a plan view of a data storage device constructed and operated in accordance with preferred embodiments of the present invention.

Referring now to the drawings, FIG. 1 provides a top plan view of a data storage device 100. The data storage device 100 includes a rigid base deck 102, which cooperates with a top cover 104 (shown in partial cutaway) to form a sealed housing for a mechanical portion of the data storage device 100. Typically, the mechanical portion of the data storage device 100 is referred to as a head-disc assembly 106. A spindle motor 108 rotates a number of magnetic data storage discs 110 at a constant high speed. A rotary actuator 112 supports a number of data transducing heads 114 adjacent the discs 110. The actuator 112 is rotated through application of current to a coil 116 of a voice coil motor (VCM) 118.

During data transfer operations with a host device (not shown), the actuator 112 moves the heads 114 to data tracks 120 (also referred to as an information track) on the surfaces of the discs 110 to write data to and read data from the discs 110. When the data storage device 100 is deactivated, the actuator 112 removes the heads 114 from the data tracks 120; the actuator 112 is then confined by latching a toggle latch 124.

Command and control electronics, as well as other interface and control circuitry for the data storage device 100, are provided on a printed circuit board assembly 126 mounted to the underside of the base deck 102. A primary component for use in conditioning read/write signals passed between the command and control electronics of printed circuit board assembly 126 and the read/write head 114 is a preamplifier/driver (preamp) 128, which prepares a read signal acquired from an information track, such as 120, by the read/write head 114 for processing by read/write channel circuitry (not separately shown) of the printed circuit board assembly 126. The preamp 128 is attached to a flex circuit 130, which conducts signals between the printed circuit board assembly 126 and the read/write head 114 during data transfer operations.

Figure 2:
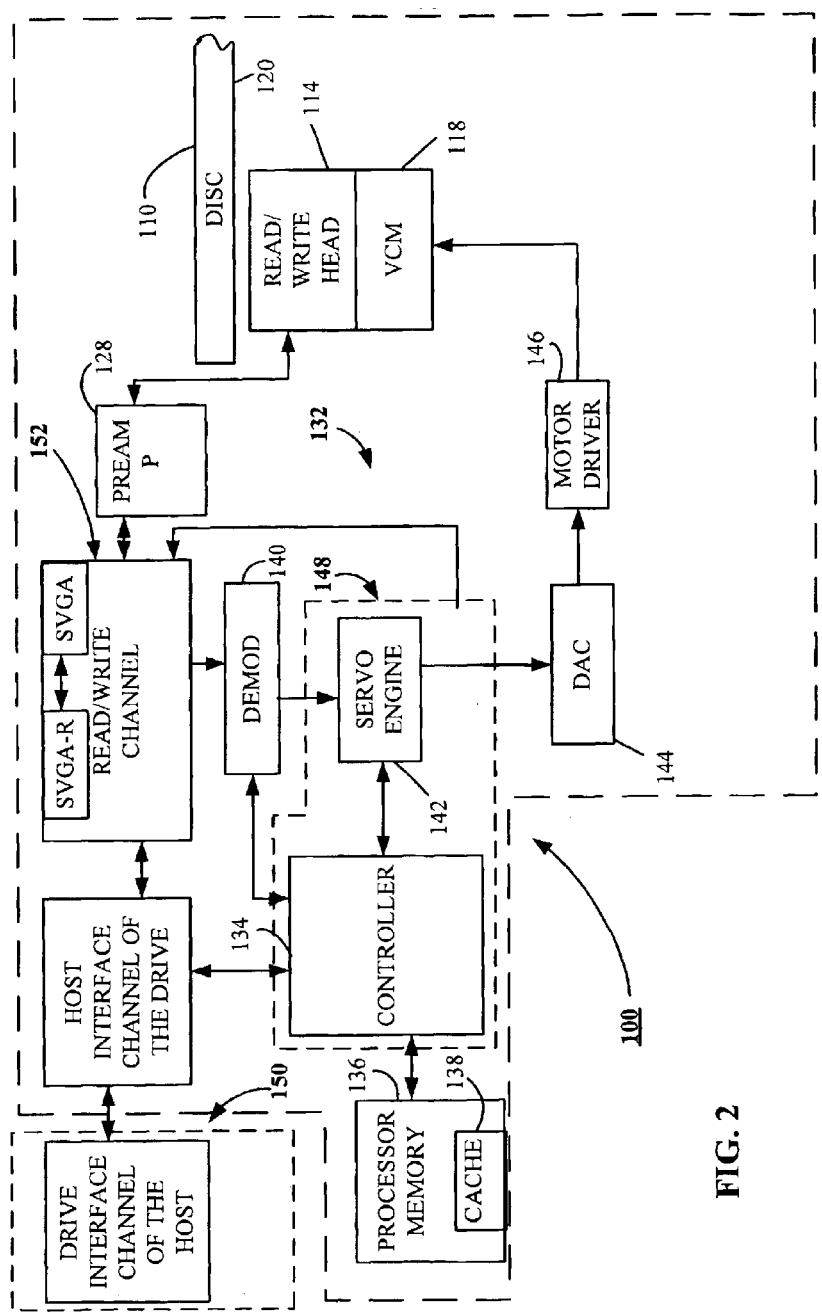
FIG. 2 is a functional block diagram of a circuit for controlling operation of the data storage device of FIG. 1, the circuit programmed with a variable data retrieval and retention prioritization routine of a read data in accordance with the present invention.

Turning to FIG. 2, position-controlling of the read/write head 114 is provided by the positioning mechanism (not separately shown) operating under the control of a servo control circuit 132 programmed with servo control code, which forms a servo control loop.

The servo control circuit 132 includes a micro-processor controller 134 (also referred to herein as controller 134), a memory 136, a cache memory 138, a demodulator (DEMOD) 140, an application specific integrated circuit (ASIC) hardware-based servo controller ("servo engine") 142, a digital to analog converter (DAC) 144 and a motor driver circuit 146. Optionally, the controller 134, the random access memory 136, and the servo engine 142 are portions of an application specific integrated circuit 148.

A portion of the random access memory 136 is used as a cache memory 138 for storage of data read from the information track 120 awaiting transfer to a host connected to the data storage device 100. The cache memory is also used for storage of data transferred from the host to the data storage device 100 to be written to the information track 120. Generally, the information track 120 is divided into a plurality of data-sectors of fixed length, for example, 512 bytes.

Similarly, the cache memory 138 portion of the random access memory 136 is sectioned into a plurality of data blocks of fixed length with each data block substantially sized to accommodate one of the plurality of fixed length data-sectors of the information track 120. For example, under a buffer memory or cache management scheme, the plurality of data blocks are grouped into a plurality of fixed length memory segments within an 8 MB cache memory.

The components of the servo control circuit 132 are utilized to facilitate track following algorithms for the actuator 112 (of FIG. 1) and more specifically for controlling the voice coil motor 118 in position-controlling the read/write head 114 relative to the selected information track 120 (of FIG. 1).

The demodulator 140 conditions head position control information transduced from the information track 120 of the disc 110 to provide position information of the read/write head 114 relative to the disc 110. The servo engine 142 generates servo control loop values used by the controller 134 in generating command signals such as seek signals used by the voice coil motor 118 in executing seek commands. Control loop values are also used to maintain a predetermined position of the actuator 112 during data transfer operations.

The command signals generated by the controller 134 and passed by the servo engine 142 are converted by the digital to analog converter 144 to analog control signals. The analog control signals are used by the motor driver circuit 146 in position-controlling the read/write head 114 relative to the selected information track 120, during track following, and relative to the surface of the disc 110 during seek functions.

In addition to the servo control code programmed into an application specific integrated circuit 148, the control code is also programmed into the application specific integrated circuit 148 for use in executing and controlling data transfer functions between a host 150 and the data storage device 100. Data received from the host 150 is placed in the cache memory 138 for transfer to the disc 110 by read/write channel electronics 152, which operates under control of the controller 134. Read data requested by the host 150, not found in cache memory 138, are read by the read/write head 114 from the information track 120, and then processed by the read/write channel electronics 152 and stored in the cache memory 138 for subsequent transfer to the host 150.

As described hereinabove, traditionally, cache memory supports a plurality of fixed length segments. As cache memory is needed to store data read from the disc 110, segments are assigned via pointers in the control code. Once a segment has been assigned, that portion of the cache memory is consumed in its entirety. Cache memory is also used for storing commands in an execution queue, as well as for storage of various operational needs of the data storage device 100 as discussed further herein below.

Because allocation of the amount of memory of the memory 136 dedicated to cache memory 138 is limited, effective utilization of the cache memory 138 is important to the overall operating performance of the data storage device 100. To maximize the effective utilization of the cache memory 138, data in addition to data requested by the host 150 is retrieved from the disc 110 during a seek operation to retrieve the data requested by the host 150. The data retrieved during a seek operation is referred to as read data and includes both a speculative data portion and a host data portion. The speculative data portion includes data preceding the host data portion and data subsequent to the host data portion. The host data portion is the specific data requested by the host 150.

Speculative data is gathered and stored in the cache memory 138 in an attempt to avoid a future mechanical seek to the disc 110 for data requested by the host 150. By satisfying a request for data from the host 150 out of the cache memory 138, use of the mechanical components of the data storage device 100 is avoided, thereby increasing data transfer performance by the data storage device 100.

Keeping in mind the limited storage space made available for the cache memory 138 and to maximize avoidance of the use of the mechanical components of the data storage device 100 for servicing request for data by the host 150, the present invention utilizes a cache management routine. The cache management routine improves both the acquisition and retention of speculative data having an improved probability of satisfying a request for data by the host 150 (discussed in more detail below).

Figure 3:
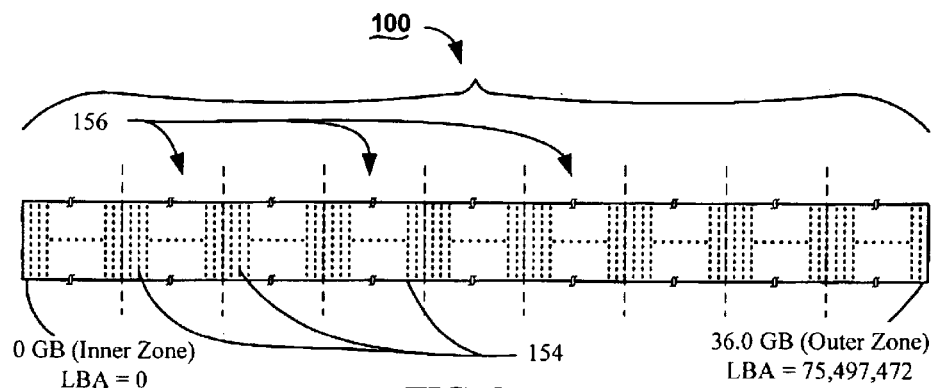
FIG. 3 is a graphical representation of a band index implementation methodology of a magnetic memory capacity of the data storage device of FIG. 1.

FIG. 3 shows the logical block address capacity of the data storage device 100 of the present invention uniformly divided into a user-specified number of equal size bands 154. Each user-specified band 154 encompasses a predetermined number of data sectors. FIG. 3 also shows a plurality of storage regions 156. The number of storage regions 156 is determined by the quantity of bands defined by the user. That is to say, each storage region 156 encompasses an equal number of bands 154. Additionally, each storage region 156 contains an equal number of identically identified bands 154.

In other words, the data storage device logical block address capacity is typically uniformly divided into a user-specified number of equal-sized bands (say "n") with each band encompassing a user-specified equal number of logical block addresses (say "s"). Optimally, both a number of bands on the size of each band will be an integral power of two, so that storing a particular logical block address into an appropriate band can be accomplished by reading a portion of the logical block address of the data request command of the host 150.

It is noted that, because selection of the number of equally sized bands 154 that form each storage region 156 is user-specified, and encompasses the entire capacity of the data storage device 100, logical block address mapping of the capacity of the data storage device 100 is unrelated to the physical mapping of the data storage device 100. This is the case whether the physical mapping is defined either by the data tracks 120 (of FIG. 1), established during the servo track writing operation, or by data zones established to facilitate zone bit recording methodologies.

If the number of storage regions 156 selected is different than the number of defined recording zones, at least one of the user-specified storage regions 156 will include at least a portion of more than one recording zone. Additionally, if the number of user-specified sectors encompassed by a band 154 is either greater than or less than the number of sectors supported by the data track 120, sectors from more than one track will be included in a band 154.

In a preferred embodiment, the number of bands is set at 4096 (2^12), and the number of sectors per band is set at (2^11). Further, each sector contains 512 bytes. Therefore, the amount of consecutive drive space that is encompassed by each region 156, is 4096×2048×512=4,294,967,296 bytes=4.000 GB, which results in nine regions 156 for a data storage device 100 with the capacity of 36.0 GB.

For illustration purposes, convenience and clarity of disclosure, absent imposition of a limitation on the present invention, FIG. 4 shows a layout of a 32-bit logical block address 158 of a preferred embodiment of the present invention. The first nine bits of the logical block address 158 are a higher order band index portion 160; the next 12 bits are a band index portion 162 (also referred to herein as index 162) while the last 11 bits are a lower order portion 164 of the logical block address 158.

Inclusion of the band index portion 162 of the logical block address 158 facilitates monitoring, capturing and using the regularity at which the host 150 (of FIG. 1) requests data from a particular band 154 (of FIG. 2) of a specific storage region 156 (of FIG. 2). The regularity at which the host 150 requests data from a particular band 154 of a specific storage region 156 is referred to herein as a host request hit frequency. In a preferred embodiment, the host request hit frequency data are used to improve acquisition of speculative data as well as to improve persistence of data stored in the cache memory 138 (of FIG. 2) as data with a likelihood of being requested by the host 150.

In a preferred embodiment, when a host data request command received from the host 150 cannot be satisfied by data stored in the cache memory 138, the data storage device initiates a seek operation to retrieve the requested host data from the disc 110 (of FIG. 1). By analyzing host request hit frequency data, a determination on selection of speculative data with a higher probability of relevance to future host data request commands can be made.

When operating the data storage device 100 in accordance with a preferred embodiment of the present invention, analysis of the host request hit frequency is facilitated by an incorporation of a history queue 166, depicted by FIG. 5, and a band count table 168, depicted by FIG. 6. In a preferred embodiment, both the history queue 166 and the band count table 168 are provided in the cache memory 138.

The history queue 166 provides storage for a predetermined number of band indexes 162 (of FIG. 4) extracted from logical block addresses 158 (of FIG. 4) of previously received host data request commands. In a preferred embodiment, the history queue 166 operates as a FIFO (first in, first-out) queue. That is, as the predetermined portion of the cache memory 138 allocated to the history queue 166 becomes full, each new band index stored in the history queue 166 pushes out the oldest band index stored in the history queue 166.

The amount of cache memory 138 allocated to the history queue 166 is a function of both the number of band indexes 162 to be stored and the bit length of each band index 162. Both the number of band indexes 162 to be stored and the bit length with each band index 162 are user definable values. In a preferred embodiment, the bit length of each band index 162 is 12 bits, while the number of band indexes 162 to be stored in history queue is 200. As such, 200 index memory cells 170, each having a length of 12 bits, are allocated from the cache memory 138 in support of the history queue 166.

In a preferred embodiment, upon receipt of a host data request command from the host 150, the controller 134 (of FIG. 2) extracts the band index 162 from the logical block address 158 associated with the host data request command and writes the band index 162 to a first index memory cell 172 of the history queue 166, and increments a value of a count portion 174 of the band count table 168.

The count portion 174 of the band count table 168 is divided into a plurality of hit frequency memory cells 176. Each hit frequency memory cell 176 is associated with one each of the predetermined plurality of band indexes 162, and sized to accommodate recordation of a predetermined number of occurrences of a host request hit frequency experienced by the band index 162 associated with the hit frequency memory cell 176. For example, if the predetermined number of occurrences for recordation of host data hit frequencies experienced by a particular band index 162 was selected to be 255, each hit frequency memory cell 176 would occupy eight bits of cache memory 138.

In a preferred embodiment, for band indexes 162 stored in the history queue 166 that are associated with host data request commands awaiting execution, the controller 134 increments by two the value in the hit frequency memory cell 176 associated with the index 162 of the host data request command awaiting execution. Upon execution of a host data request command, the controller 134 decrements by one the value in the hit frequency memory cell 176 associated with the index 162 of the executed host data request command.

In a preferred embodiment, upon receipt of a host data request command, for host data not present in the cache memory 138, the controller 134 updates the history queue 166 and the band count table 168. The band count table 168 for the host request hit frequency count associated with the band index 162.

If the value in the hit frequency memory cell 176 associated with the band index 162 exceeds a predetermined threshold, the controller 134 analyzes the read data present in the cache memory 138 associated with the band index 162. A range for speculative data to be acquired can be established by analyzing and comparing the data sectors of the read data present in the cache memory 138 associated with band index 162, to the data sectors associated with the host data request command.

For example, if the data sectors associated with the prior read data sharing a common band index 162 substantially precede the data sectors of the requested host data, and there is a presence of data sectors between the prior data sectors present in the cache memory 138 and the data sectors of a requested host data, the controller 134 will adjust the range for acquisition of the speculative data in favor of read on arrival data. In other words, the controller 134 will attempt to acquire, as speculative data, data present in the sectors separating the sectors containing the requested host data and the sectors containing read data already present in the cache memory 138. This approach is known as "hole filling".

Depending on the analysis of the contents of the history queue 166 and the hit frequency memory cells 176 of the band count table 168, the controller 134 may set the range for acquisition of the speculative data portion of the read data to be 100% read on arrival data or 100% read look ahead data or any combination thereof. For example, the controller 134 may set the range for the read on arrival to be 25% of the speculative data, and the range for the read look ahead data to be 75% of the speculative data.

In addition to the utilization of the history queue 166 and the band count table 168 to adjust the range for acquisition of speculative data, both the history queue 166 and the band count table 168 are utilized in the management of the cache memory 138. When the cache memory 138 is full, the history queue 166 and the band count table 168 are analyzed to determine a prioritization for release of read data from the cache memory 138. The prioritization for release is based on the age of the read data, and whether or not the read data is included in the band with a high host request frequency hit count. The oldest read data with the lowest host request frequency hit count is the read data released first from the cache memory 138 as additional space is needed.

That is to say, if the oldest read data in the cache memory 138 is data associated with the band 154 that has a high host request frequency hit count, the next oldest read data in the cache memory 138 is analyzed. If the next oldest read data is associated with the band 154 that has a low host request frequency hit count, that data (i.e., the next oldest) will be released from the cache memory 138 prior to release of the oldest data in the cache memory 138.

The number of host request frequency hit counts associated with a particular band 154 to qualify as a high host request frequency hit count is a user-specified threshold. In a preferred embodiment, a convenient threshold to qualify a band 154 as a high host request frequency hit count band has been found to be a count of 15.

In response to a need for additional storage space in the cache memory 138, the controller 134 analyzes the band count table 168 to aid in identifying an oldest cache memory fragment with a lowest count in the count portion 174 of the band count table 168. Upon identification of the oldest cache memory fragment with lowest count in the hit frequency memory cell 176, the controller 134 releases that cache memory fragment from the cache memory 138.

Figure 7:
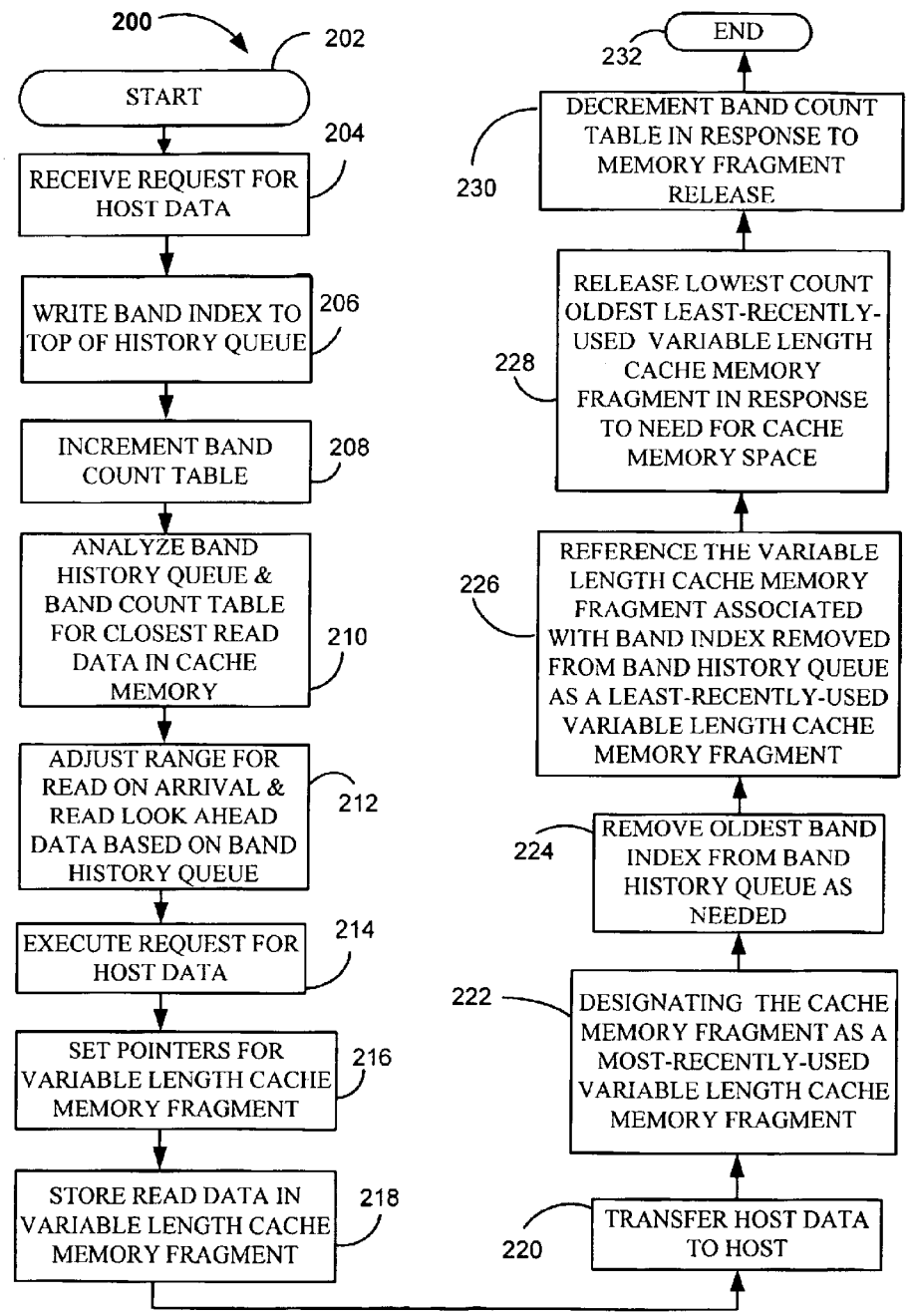
FIG. 7 is a flow chart of a cache management routine programmed into the circuit of the data storage device of FIG. 1.

FIG. 7 provides a flow chart for cache memory management routine 200, generally illustrative of steps carried out in accordance with preferred embodiments of the present invention. The routine is preferably carried out during data transfer operations of a data storage device (such as 100) communicating with a host (such as 150).

The routine 200 starts at start step 202 and continues at step 204 with the receipt of a request for host data from the host (such as 150). Upon receipt of the request for host data, a controller (such as 134) reviews the request for host data and determines whether or not the host data is present in a cache memory (such as 138), extracts a band index (such as 162) from a logical block address (such as 158) and writes the extracted band index to the top of a FIFO history queue (such as 166) at process step 206.

At process step 208, the controller increments a count in at least one hit frequency memory cell (such as 176) of a band count table (such as 168) associated with the host data. If the requested host data is present in the cache memory, the controller skips process steps 210, 212, 214, 216 and 218, and proceeds directly to process step 220 and transfers the host data to the host.

If the host data requested is unavailable in the cache memory, the controller effects retrieval of the requested host data from an information track (such as 120) of a disc (such as 110). In addition to retrieval of the host data, the controller selectively instructs a read/write channel electronics (such as 152) to retrieve data in excess of the host data. The data in excess of the host data is referred to as speculative data, which may include either or both read on arrival data and read look ahead data.

At process step 210, the controller analyzes the history queue and the band count table for read data in the cache memory with logical block addresses that reside in a same band (such as 154) of a same region (such as 156) of the disc as the logical block address of the requested host data. Continuing at process step 212, upon identifying read data resident in the cache memory that resides in the same band as the host data, the controller adjusts the range of the speculative data to be retrieved.

For read data that resides in logical block addresses that occur before the logical block address for the requested host data, the controller will skew the collection of the speculative data in favor of read on arrival data. For read data that resides in logical block addresses following the logical block address for the requested host data, the controller will skew the collection of the speculative data in favor of read look ahead data.

With the range of the speculative data adjusted in accordance with read data present in the cache memory, the controller executes a seek command to retrieve the speculative data and the requested host data from the disc at process step 214. Additionally, the controller identifies the number of data-sectors associated with the read data and speculative data and assigns a substantially equal number of data blocks (such as 180) in a cache memory of a memory (such as 136) of the data storage device.

At process step 218, the controller stores the speculative data and requested host data as a newly acquired read data in the variable length memory fragment and proceeds to step 220 with transfer of the host data portion of the newly acquired read data to the host. At process step 222, the variable length memory fragment associated with the newly acquired read data is designated as a most-recently-used variable length memory fragment, which allows the newly acquired read data to persist in the cache memory for a period greater than a least-recently-used variable length memory fragment is allowed to persist in the cache memory. If the host issues a request for host data and the history queue is full, at process step 224, the controller effects removal of an oldest band index in an index memory cell (such as 172) from the FIFO history queue in response to a need for storage of a new band index.

In response to a need for additional cache memory space, the controller releases the oldest memory fragment with the lowest count from the cache memory at process step 228. At process step 230, in response to the release of the oldest least-recently-used cache memory fragment, the controller decrements the hit frequency memory cell of the band count table of the band count by one, and the cache memory management routine 200 concludes with end process step 232.

When operating the data storage device 100 in accordance with an alternate preferred embodiment of the present invention, analysis of the host request hit frequency is facilitated by an incorporation of a history queue 240, depicted by FIG. 8, and a band count table 242, depicted by FIG. 9. In a preferred embodiment both the history queue 240 and the band count table 242 are provided in the cache memory 138.

The history queue 240 provides storage for a predetermined number of band indexes 162 (of FIG. 4) in combination with a higher order band index portion 160 (of FIG. 4) each extracted from logical block addresses 158 (of FIG. 4) of previously received host data request commands. In a preferred embodiment, the history queue 240 operates as a FIFO (first in, first-out) queue, handles 200 entries and occupies 200 index memory cells 244, each having a length of 23 bits, 12 for the band index portion and 11 for the higher order band index portion 160 of the logical block address 158.

In an alternate preferred embodiment, upon receipt of a host data request command from the host 150, the controller 134 (of FIG. 2) extracts the band index 162 and the higher order band index 160 from the logical block address 158 associated with the host data request command. The controller 134 combines the extracted indexes and writes the combined extracted indexes to a first index memory cell 246 of the history queue 240 and increments a value of a count portion 248 of the band count table 242. By combining the higher order band index 160 with the band index 162, both the band 154 and the specific storage region 156 (of FIG. 3) of the plurality of storage regions 156, the storage region 156 that the host data request command resides is identified.

The count portion 248 of the band count table 242 is divided into a plurality of hit frequency memory cells 250. Each hit frequency memory cell 250 is associated with one each of the predetermined plurality of band indexes 162 and designated within each storage region 156, and sized to accommodate recordation of a predetermined number of occurrences of a host request hit frequency experienced by a band index 162 of a specific storage region 156. For example, if the predetermined number of occurrences for recordation of host data hit frequencies experienced by a particular band index 162 of a particular storage region 156 was selected to be 255, each hit frequency memory cell 176 would occupy eight bits of cache memory 138.

It is noted that, incorporating the band count table 242, which takes into account both the band 154 (of FIG. 3) and the storage region 156, a problem referred to as "overlap" is avoided. Overlap occurs when the band index 162 is extracted from logical block address 158, but the higher order band index portion 160 is not extracted from the logical block address 158, and the controller 134 improperly increments a value in the hit frequency memory cell 250 of the count portion 248 of the band count table 242. In other words, let's say the band index is for band 4227 of storage region 7, but since the controller 134 does not also store the region, then a band index 4227 of storage region 2 would be indistinguishable and therefore both of their increments and decrements would be to the same hit frequency memory cell 250. By building the band count table 242 that incorporates knowledge of both the band 154 and the storage region 156, the problem or overlap is resolved.

Implementation of the cache memory management routine 200 (of FIG. 8) is neither inhibited nor encumbered by utilization of either the history queue 166 (of FIG. 5) in combination with the band count table 168 (of FIG. 6), or the history queue 240 (of FIG. 9) in combination with the band count table 248 (of FIG. 10). Operation of routine 200 remains substantially the same.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the appended claims.

What is claimed is:

1. A method comprising the steps of:
    processing a host data request command for a host data having a first logical block address;
    identifying a second logical block address in a cache memory closest to the first logical block address;
    adjusting a range for acquisition of a speculative data based on the second logical block closest to the first logical block address;
    acquiring the host data together with the speculative data to form a read data; and
    storing the read data in a cache memory fragment of the cache memory.

2. The method of claim 1, in which the host data request command is processed by steps comprising:
    receiving the host data read command for retrieval of the host data;

transferring the host data read command to a command queue of the cache memory;

writing a band index of the logical block address to a history queue; and incrementing a band count table in relation to the band index.

3. The method of claim 1, in which the host data together with the speculative data are acquired by steps comprising: forming a read data acquisition command based on the host data request command and the adjusted range for acquisition of the speculative data; transferring the read data acquisition command to a command queue of the cache memory; and executing the read data acquisition command from the command queue to retrieve the read data from a data sector.

4. The method of claim 3, in which the read data acquisition command is executed by steps comprising:

reading a read on arrival data portion of the speculative data from a first predetermined data-sector preceding a host data data-sector, the first predetermined data-sector based on the adjusted range for acquisition of the speculative data;

transducing the host data from the host data data-sector;

retrieving a read look ahead data portion of the speculative data from a second predetermined data-sector subsequent to the host data data-sector, the second predetermined data-sector based on the adjusted range for acquisition of the speculative data; and selecting a cache memory fragment to accommodate the acquired read on arrival data along with the host data in addition to the read look ahead data.

5. The method of claim 1, in which the second logical block address is identified by searching a band index associated with the first logical block address.

6. The method of claim 5, in which the content of the history queue comprises a band index.

7. The method of claim 6, in which the host data request command is a plurality of host data request commands, and in which the content of the band count table is a count of the plurality of host data request commands having a common band index.

8. The method of claim 2, in which the history queue comprises a memory cell of the cache memory, wherein the memory cell is sized to accommodate the band index.

9. The method of claim 2, in which the band count table comprises a memory cell of the cache memory, wherein the memory cell is sized to accommodate a predetermined number of occurrences of the band index.

10. The method of claim 2, in which the first logical block address comprises a band index portion associated with a high order band index portion and further associated with a low order band index portion, and in which the history queue comprises a first memory cell of the cache memory sized to accommodate the high order band index portion together with the band index portion, and further in which the band count table comprises a second memory cell of the cache memory sized to accommodate a predetermined number of occurrences of the band index together with its associated high order band index.

11. A data storage device comprising:

a head-disc assembly with a magnetic data storage disc having an information track;

a read/write head positionably adjacent the magnetic data storage disc retrieving a read data from the information track, the read data having a speculative data portion along with a host data portion; and a printed circuit board assembly with a cache memory and a control processor communicating with the head-disc assembly controlling retrieval of the read data, the cache memory storing the host data along with the speculative data, the control processor programmed with a routine for adjusting a range for acquisition of the speculative data based on an analysis of previously acquired read data.

12. The data storage device of claim 11, in which the routine for adjusting a range for acquisition of the speculative data based on an analysis of previously acquired read data:

processing a host data request command for a host data having a first logical block address;

identifying a second logical block address in a cache memory closest to the first logical block address;

adjusting the range for acquisition of the speculative data based on the second logical block closest to the first logical block address;

acquiring the host data together with the speculative data to form the read data; and storing the read data in a cache memory fragment of the cache memory.

13. The data storage device of claim 12, in which the read data is stored in the cache memory by steps comprising:

receiving a host data read command for retrieval of the host data;

executing a seek command to retrieve the host data from a predetermined data-sector;

reading a read on arrival data from a data-sector preceding the predetermined data-sector;

transducing the host data from the predetermined data-sector;

retrieving a read look ahead data from a data-sector subsequent to the predetermined data-sector;

selecting a cache memory fragment sized to accommodate the read on arrival data along with the host data in addition to the read look ahead data; and storing the read on arrival data along with the host data in addition to the read look ahead data in the cache memory fragment to form the read data.

14. The data storage device of claim 13, in which the host data request command is processed by steps comprising:

receiving the host data read command for retrieval of the host data;

transferring the host data read command to a command queue of the cache memory;

writing a band index of the logical block address to a history queue; and incrementing a band count table in relation to the band index.

15. The data storage device of claim 14, further comprising the steps of:

setting a pointer in the cache memory associated with the cache memory fragment;

transferring the host data from the cache memory to a host;

referencing the pointer for the cache memory fragment to a most-recently-used portion of a least-recently-used list; and removing an oldest band index from the history queue.

16. The data storage device of claim 15, further comprising the steps of:

referencing a pointer for the oldest band index removed from the history queue to a least-recently-used portion of the least-recently-used list;

releasing an oldest cache memory fragment with a lowest count band count table value from the cache memory in response to a need for cache memory space; and decrementing the band count table in response to release of the oldest cache memory fragment with the lowest count band count table value.

17. The data storage device of claim 13, in which the host data together with the speculative data are acquired by steps comprising:

forming a read data acquisition command based on the host data request command and the adjusted range for acquisition of the speculative data;

transferring the read data acquisition command to a command queue of the cache memory; and executing the read data acquisition command from the command queue to retrieve the read data from a data-sector.

18. A data storage device comprising:

a head-disc assembly with a magnetic data storage disc having an information track with read data in addition to a speculative data; and a printed circuit board assembly controlling acquisition of the speculative data by steps for adjusting a range for acquisition of the speculative data.

19. The data storage device of claim 18, in which the range for acquisition of the speculative data is adjusted by steps comprising:

processing a host data request command for a host data having a first logical block address;

identifying a second logical block address in a cache memory closest to the first logical block address;

adjusting a range for acquisition of a speculative data based on the second logical block closest to the first logical block address;

acquiring the host data together with the speculative data to form a read data; and storing the read data in a cache memory fragment of the cache memory.

20. The data storage device of claim 19, in which the host data request command is processed by steps comprising:

receiving the host data read command for retrieval of the host data;

transferring the host data read command to a command queue of the cache memory;

writing a band index of the logical block address to a history queue; and incrementing a band count table in relation to the band index.

* * * * *